Patented Feb. 9, 1937

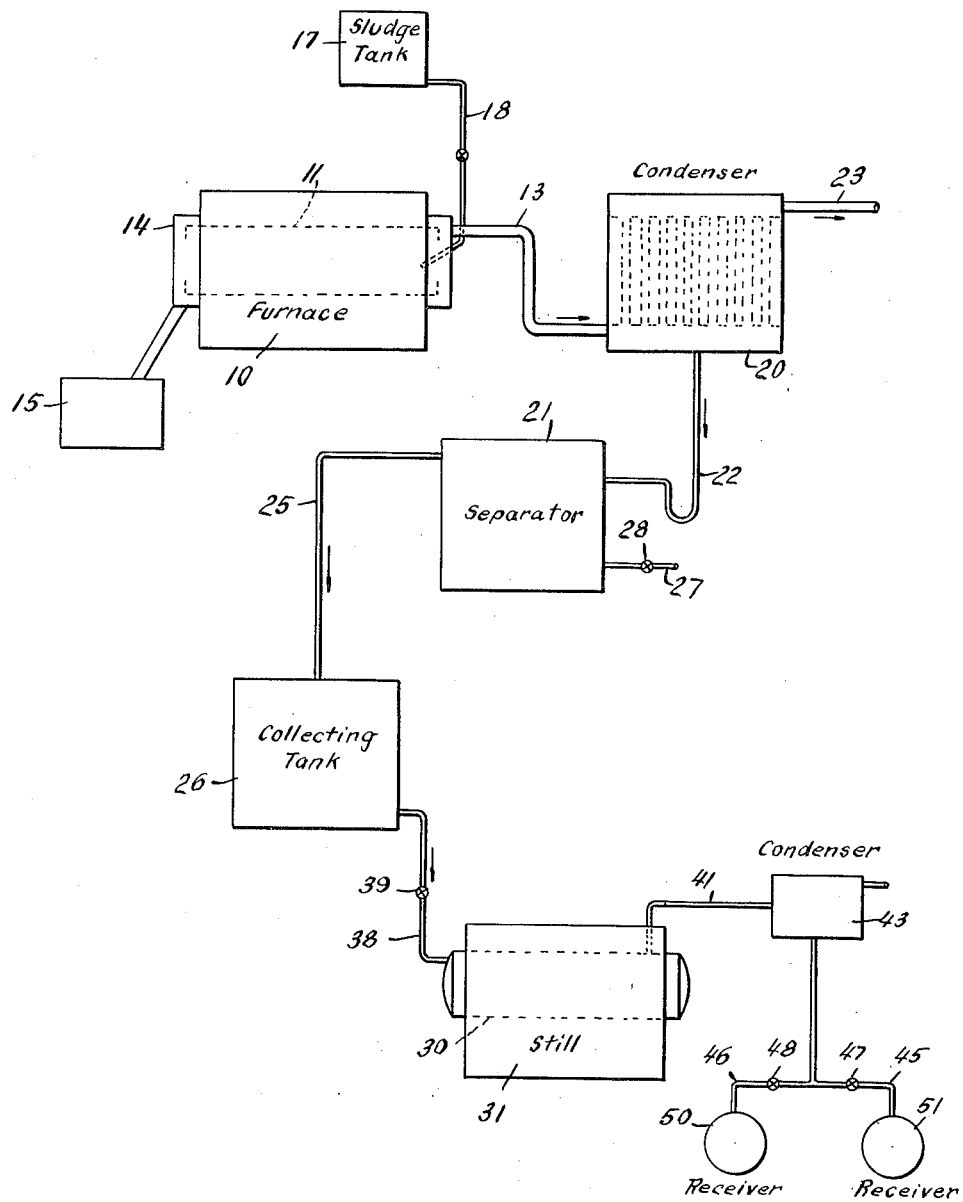

2,070,256

UNITED STATES PATENT OFFICE 2,070,256

METHOD FOR MAKING A SULPHUR BEARING OIL

Bernard M. Carter, Montclair, N. J., Theodore V. Fowler, Pelham, N. Y., and Henry F. Merriam, West Orange, N. J., assignors to General Chemical Company, New York, N. Y., a corporation of New York Application April 20, 1934, Serial No. 721,482

5 Claims. (Cl. 196—148)

This invention relates to improvements in oils, and in methods for making the same. More especially, the invention is directed to sulphur bearing oils derived from sludges formed in oil refining processes in which sulphuric acid is employed.

The principal object of the invention is directed to the provision of sulphur bearing oils, preferably of relatively high sulphur content. The invention also aims to provide oils having a high sulphur content substantially all of which sulphur is in chemical combination. It is a further object of the invention to provide relatively high sulphur oils which are stable and do not become turbid, or deposit sulphur on standing. Another object of the invention is the provision of methods for making the improved oils.

In oil refining processes, involving treatment of petroleum distillate oils with sulphuric acid, large quantities of sludges are produced. When destructively decomposed by heating, these sludges form gas mixtures containing water vapor and condensable hydrocarbon vapors, and gases such as sulphur dioxide, carbon dioxide, nitrogen and uncondensable hydrocarbons.

It has been discovered that when sludge material, resulting from treatment with sulphuric acid of relatively light hydrocarbon oil distillates containing substantial quantities of sulphur compounds, is destructively decomposed by heating to form a hot gas mixture containing hydrocarbon vapors and the gas mixture is cooled, for example to about normal temperature, an oily condensate is obtained which is a sulphur bearing oil having valuable properties. It has been discovered that these oils are light colored, light bodied, stable oils, high in sulphur in strong chemical combination, and which do not become turbid or deposit free sulphur on standing.

A further appreciation of the objects and advantages of the invention may be had from a consideration of the following description of the improved oils and of methods for making the oils. The accompanying drawing illustrates diagrammatically apparatus by which the improved sulphur oils may be made.

Referring to the drawing, 10 indicates the combustion chamber of a furnace adapted to burn coal, coke, oil, natural gas or other fuel. Mounted in chamber 10 is a decomposing kiln or retort 11 of any desirable construction, for example a fixed shell provided with suitable mechanism such as a screw conveyor, not shown, to facilitate discharge of coke. A rotary retort may also be employed if desired. Preferably an externally heated kiln adapted to substantially exclude admission of air is used. One end of kiln 11 communicates with a gas outlet 13, and the opposite end projects into a header 14 into which the solid residue of the decomposition of the acid sludge is continuously discharged. Header 14 empties into air-lock 15 through which coke may be discharged without admitting air to the kiln. Acid sludges constituting sources of the improved oils are run into the kiln from supply tank 17 through a valve-controlled pipe 18. Gas outlet 13 is connected to the lower end of a cooler or condenser 20 of any suitable construction, either air or water cooled, and operated so as to reduce the temperature of the gas stream to substantially normal to condense the bulk of the water vapor and a major portion of condensable hydrocarbons contained in the gas. Condensate from the cooler drains into a collecting tank 21 through a pipe 22 having a liquid seal.

The gases uncondensed in cooler 20, containing principally sulphur dioxide, are discharged through gas line 23, and may be used as desired, for example, in the manufacture of sulphuric acid.

Separator 21 may be a tank or vat large enough to permit continuous gravity separation of water and oil contained in the condensate discharged from condenser 20. The hydrocarbon oils of the condensate rise to the top of the mass in the separator, and may be withdrawn continuously or intermittently through pipe 25 discharging into a collecting tank 26. Water settling to the bottom of the separator may be drawn off through pipe 27, controlled by valve 28, and discharged to waste or otherwise disposed of.

The still 30, of any approved construction, may be externally heated by hot combustion gases generated in brickwork setting 31. Raw condensate from collecting tank 26 is run into the still through pipe 38, controlled by valve 39. Vapors generated in the still flow through line 41 to a condenser 43, the condensate of which drains through pipes 45 and 46, into receivers 50 and 51.

The improved oils of the invention may be made in apparatus such as illustrated in the drawing and described above by operating substantially as follows:

In producing the improved sulphur bearing oils, acid sludges which may be employed are those resulting from sulphuric acid treatment of light distillate oils obtained from petroleum crudes containing sulphur. The acid sludges employed in making the sulphur bearing oils of the present invention are preferably sludges resulting from treatment with sulphuric acid of light hydrocarbon oil distillates such as gasoline and kerosene, containing not less than about 0.15% sulphur. Illustrative examples of distillate oils from which sludges are produced of a character suitable for use in the present invention are straight-run gasoline distillates containing about 0.15% sulphur or more, and cracked distillates averaging 0.25 to 0.30% sulphur or more.

Sludge material of the type indicated and which may have for example a titratable acidity of 40% to 60% expressed as $H_2SO_4$ is continuously fed into kiln 11 from supply tank 17. The burners in furnace 10 are adjusted to maintain within the kiln temperatures desirably not in excess of about 750° F., as above this temperature the sulphur oils of the present invention tend to be decomposed. The preferred temperatures are about 250° F. at the sludge inlet end, and about 500° F. to 600° F. at the coke outlet end of the kiln.

The sludge, gradually passed through the retort, is relatively gradually heated through the preferred temperature range and is decomposed by the action of heat, and the free and/or combined sulphuric acid of the sludge is reduced to sulphur dioxide by the hydrogen of the hydrocarbons and/or by the carbonaceous matter contained in the sludge. The sludge material is thus destructively decomposed by heating with production of substantial amounts of sulphur dioxide, the sludge being decomposed without hydrolysis and in the absence of extraneous water. By destructive decomposition of the sludge water vapor is produced and hydrocarbon vapors and sulphur compounds are evolved. Residual coke is continuously discharged from the kiln through air-lock 15. The major part of the sulphur oils of the present invention are evolved by the time the sludge has reached a temperature of 350–400° F.

The gas resulting from the decomposition of the sludge contains principally water vapor and sulphur dioxide, substantial amounts of condensable hydrocarbons and sulphur compounds and smaller quantities of uncondensable hydrocarbons and gases such as carbon dioxide, carbon monoxide, and nitrogen. For example, the exit gas mixture of the retort may contain by volume about 50% water vapor, about 10% condensable hydrocarbon vapors and sulphur compounds, the balance comprising sulphur dioxide, carbon dioxide, carbon monoxide, nitrogen, hydrocarbon gases and oxygen. As previously noted, according to a preferred embodiment of the process for making the sulphur bearing oils of the invention, decomposition of sludges is effected in the kiln substantially in the absence of oxygen and in absence of other extraneous gases. When so operating, formation of carbon dioxide is lessened, presumably because oxidation of hydrocarbons and burning of carbonaceous matter of the sludge is prevented.

The hot gaseous and vaporous products of decomposition of the sludge are discharged from the kiln and passed through conduit 13 into condenser 20 in which the gases are cooled to substantially normal temperatures. Cooling may be accomplished by circulating through the condenser in indirect heat exchange relation with the retort gas mixture any suitable cooling liquid or gas. In place of the condenser illustrated in the drawing, a vertical tower having a spray head at the top for introduction of water may be employed. In such cases, the retort gas mixture is introduced into the bottom of the tower and flows upwardly, intimately contacting and mingling with the downwardly directed spray of water fed in at the top of the tower. The amount of cooling water introduced is so controlled as to cool the exit gases leaving the top of the tower to about normal atmospheric temperatures.

During cooling of the retort gas mixture in the condenser 20, substantially all of the water vapor and the major portion of the condensable hydrocarbon vapors and sulphur compounds are condensed out of the gas stream. The condensate of cooler 20, containing varying proportions of water and liquid hydrocarbons and sulphur compounds is drained through pipe 22 into separator 21. In the latter, the oils rise to the top of the liquid mass in the tank, and may be intermittently or continuously withdrawn through pipe 25 into tank 26 for collecting what may be considered a raw condensate. The water settling to the bottom of the separator 21 may be discharged from the system through pipe 27.

The oil collecting in tank 26 is an oil containing generally from about 3 to about 22% sulphur, apparently in strong chemical combination. It will be understood the sulphur content of this condensate may vary considerably in accordance with the characteristics of the initial crude oils and of the acid sludges produced on treatment of the hydrocarbon oil distillates with sulphuric acid. For example, an acid sludge formed through sulphuric acid treatment of a straight-run gasoline yielded an oil condensate of 12% by volume of the sludge, the condensate analyzing 14.8% sulphur. A cracked distillate sludge yielded 10% by volume of oil condensate having a sulphur content of 7.5%. In another instance, a cracked distillate averaging about .25 to .30% sulphur produced on treatment with sulphuric acid a sludge which, on treatment in accordance with the present method, yielded 10.8% by volume of oil condensate analyzing 20.8% sulphur.

The oils produced as described above are sulphur bearing oils having valuable properties rendering them suitable for use in the arts, for example as cutting and drawing oils. The raw condensates recovered in tank 26 may, if desired, be considered as constituting the oils of the invention. However, since the oil in this state contains appreciable quantities of foreign matter, such as coke dust and tars, and also a low boiling fraction of low flash point it is preferred to remove these substances. This may be done by distillation. For this purpose, oils from tank 26 are run into still 30 through line 38. The distillation operation may be carried out in any suitable still, preferably one provided with equipment for collecting separate fractions of distillate. Distillation of the raw condensate is principally for two purposes, first, to remove coke and tars from the oil, and second, to produce preferably two fractions, one having a relatively low boiling range and containing low flash point hydrocarbons, and another fraction having a higher boiling point range and constituting the preferred oil of the invention. Distillation may be effected for example by external heating of still 30. If desired, distillation of the crude condensate may also be accomplished at temperatures lower than those hereinafter mentioned by introducing live steam directly into the oil body while externally heating the same. Distillation may also be effected, though possibly less desirably, by superheated live steam, using steam at slightly above atmospheric pressure and heated to say 225–250° F. before introduction into the oil. Vacuum distillation may be employed if desired.

Still 30 is operated to produce a first cut including all the oils distilling over at temperatures up to about 350° F. Vapors generated within this temperature range are liquefied in condenser 43, and are run into receiver 50. This relatively low boiling fraction may for example constitute approximately 20% by volume of the raw condensate fed into still 30. When removal of these low boiling fractions from the oil in still 30 is substantially complete, the temperature is raised to distill over oils having boiling points ranging from about 350° F. up to about 650° F. Vapors formed are condensed in cooler 43, and may be recovered in receiver 51. This high boiling fraction may comprise for example 70% by volume of the raw condensate introduced into still 30. Approximately 10% of the original raw condensate withdrawn from tank 26 remains as a coke or asphalt residue in the still.

The low boiling cut recovered in receiver 50 contains a slightly higher percentage of sulphur than the higher boiling fraction collected in receiver 51. This low boiling cut while useful for example as a cutting oil has somewhat too low flash point for general use in cutting.

The preferred oil of the invention is the higher boiling fraction recovered in receiver 51, and such oil may be so used directly as condensed in cooler 43. The oil, however, apparently contains substances such as pyridines and mercaptans which impart to the oil undesirable odors and which render the oil somewhat unstable on standing. Accordingly, it is preferred to further treat the oil to stabilize the same and remove odors. This may be accomplished by treating the oil with a solution of caustic soda or sulphuric acid or both. When employing caustic alkali, as is preferred, the oil may be agitated with a 20% caustic soda solution at temperatures of about 190° F. until reaction appears complete. The reaction products are allowed to settle, and are withdrawn. The oil may then be washed with water to remove traces of alkali, and brightened as by blowing with air.

The oil may also be stabilized by treatment with sulphuric acid, say about equal volume, and washed with water and alkali to remove traces of acid. It is preferred to use acid of concentration not in excess of about 60% $H_2SO_4$, since acid of this or less concentration does not appear to have appreciable effect on valuable sulphur compounds which should preferably be retained in the product. If desired, the oils may be stabilized by using acid of greater concentration, say up to about 93% $H_2SO_4$, in which case the amount of stronger acid employed should not desirably exceed about 7% by volume of the oil treated.

Treatment of the oil with either caustic alkali or sulphuric acid notably improves the odor and increases the stability of the oil. In some instances, it is preferred to subject the oil to treatment with both caustic alkali and sulphuric acid. In this case, after subjecting the oil to the caustic soda treatment noted above, and removing the alkali extract, the oil is washed with water to remove the alkali, and is then treated with one or more washes of equal volume of dilute sulphuric acid, for example 30% $H_2SO_4$. The final oil product may be washed with water to remove traces of acid, and then brightened by blowing with air, or other methods.

Strong sulphuric acid appears to extract at least some of the valuable sulphur compounds from the stabilized and unstabilized oils of the invention. It has been noted in this connection that sulphuric acid stronger than about 70% and preferably about 93.2% (66° Bé.) will remove these sulphur compounds from the stabilized and unstabilized oils to form an acid sludge, and on hydrolysis of the acid sludges produced by such treatment practically the same volume of oil is recovered as was removed with the sulphuric acid and the oils recovered on hydrolysis are considerably higher in sulphur content than the original oil. For example, on treating a heavy fraction stabilized by treatment with both caustic alkali and weak sulphuric acid, boiling approximately within the range 350-650° F. and containing about 11.6% sulphur, with about twice the volume of 93.2% sulphuric acid (66° Bé.), the sulphur in the acid treated oil, after separation of the acid sludge formed was reduced to about 1.9%, and the sulphur content of the oil obtained from hydrolysis of the acid sludge was about 19%.

The heavy fraction stabilized, for example as mentioned above, is a sulphur bearing mineral oil, light in color, light bodied, possessing no undesirable odor, and having a high sulphur content, substantially all of which is in strong chemical combination. It appears substantial amounts of the contained sulphur are present as alkyl sulphides and possibly also some disulphides. The sulphur content varies from about 3 to about 22%. The oil on standing does not become turbid or deposit sulphur, a property highly desirable in sulphur bearing oils. In this connection, sulphur oil of the invention has been subjected to a cold test, and it was found that at a temperature of 14° C. below zero, there is no separation of sulphur, the oil remaining unclouded and of substantially unchanged viscosity.

The oils of the invention are a light straw color. The specific gravity of a representative oil is about 0.98. The viscosity is low, about 32 to 34 Saybolt at 100° F. The oils of the invention are light bodied, flow easily and spread well. Further, since the oils are readily miscible with heavier oils in all proportions and as the sulphur content of the improved oils is high, the oils of the invention may be compounded with non-sulphur mineral oils of requisite viscosity if desired to give compositions of desired characteristics and of high sulphur content.

While the preferred oil of the invention is the stabilized fraction having boiling points ranging from about 350° F. up to about 650° F., it will be understood the lower boiling fraction recovered in receiver 50 may be used if desired in stabilized or unstabilized condition, or the oil collecting in tank 26 may be used in stabilized or unstabilized condition. However, where the oil of tank 26 is to be used, it is preferable to distill the oil to effect removal of foreign matter such as coke dust and tars.

We claim:

1. The method for making a sulphur bearing oil comprising destructively decomposing sludge material, resulting from treatment of light hydrocarbon oil distillates containing not less than about 0.15% sulphur with sulphuric acid, by heating substantially in the absence of extraneous gases to temperatures not less than about 250° F. and not more than about 600° F. to form a hot gas mixture containing sulphur dioxide, water and hydrocarbon vapors, cooling the gas mixture to condense the vapors and separate the same from the sulphur dioxide and form a condensate containing water and oil, separating oil and water, and recovering the oil.

2. The method for making a sulphur bearing oil comprising destructively decomposing sludge material, resulting from the treatment of light hydrocarbon oil distillates containing not less than about 0.15% sulphur with sulphuric acid, by heating gradually substantially in the absence of extraneous gases to temperatures not in excess of about 600° F. to form a hot gas mixture containing sulphur dioxide, water and hydrocarbon vapors, cooling the gas mixture to about normal temperature to condense the vapors and separate the same from the sulphur dioxide and form a condensate containing water and oil, separating water and oil, distilling the oil, and recovering as condensates a light fraction boiling below about 350° F. and a heavy fraction boiling substantially within the range 350° to 650° F.

3. The method for making sulphur bearing oil comprising destructively decomposing sludge material, resulting from treatment of light hydrocarbon oil distillates containing not less than about 0.15% sulphur with sulphuric acid, by heating substantially in the absence of extraneous gases to temperatures of not less than about 250° F. and not more than about 600° F. to form a hot gas mixture containing sulphur dioxide, water and hydrocarbon vapors, cooling the gas mixture to about normal temperature to condense the vapors and separate the same from the sulphur dioxide and form a condensate containing water and oil, separating water and oil, distilling the oil, recovering as condensates a light fraction boiling below about 350° F. and a heavy fraction boiling substantially within the range 350° to 650° F., and treating the heavy fraction with caustic alkali to stabilize the fraction.

4. The method for making a sulphur bearing oil comprising destructively decomposing sludge material, resulting from the treatment of light hydrocarbon oil distillates containing not less than about 0.15% sulphur with sulphuric acid, by heating substantially in the absence of oxygen to temperatures of not less than about 250° F. and not more than about 600° F. to form a hot gas mixture containing sulphur dioxide, water and hydrocarbon vapors, cooling the gas mixture to about normal temperature to condense the vapors and separate the same from the sulphur dioxide and form a condensate containing water and oil, separating water and oil, distilling the oil, recovering as condensates a light fraction boiling below about 350° F. and a heavy fraction boiling substantially within the range 350° to 650° F., and treating the heavy fraction with caustic alkali to stabilize the fraction.

5. The method for making a sulphur bearing oil comprising destructively decomposing sludge material, resulting from the treatment of light hydrocarbon oil distillates containing not less than about 0.15% sulphur with sulphuric acid, by heating gradually substantially in the absence of extraneous gases to temperatures not in excess of about 600° F. to form a hot gas mixture containing sulphur dioxide, water and hydrocarbon vapors, cooling the gas mixture to about normal temperature to condense the vapors and separate the same from the sulphur dioxide and form a condensate containing water and oil, separating water and oil, distilling the oil, and recovering as condensate a heavy fraction boiling substantially within the range 350° to 650° F.

BERNARD M. CARTER.
THEODORE V. FOWLER.
HENRY F. MERRIAM.